E. VAN WAGENEN.
ELECTRICAL SYSTEM OF DISTRIBUTION.
APPLICATION FILED JULY 12, 1909.
1,003,829.
Patented Sept. 19, 1911.
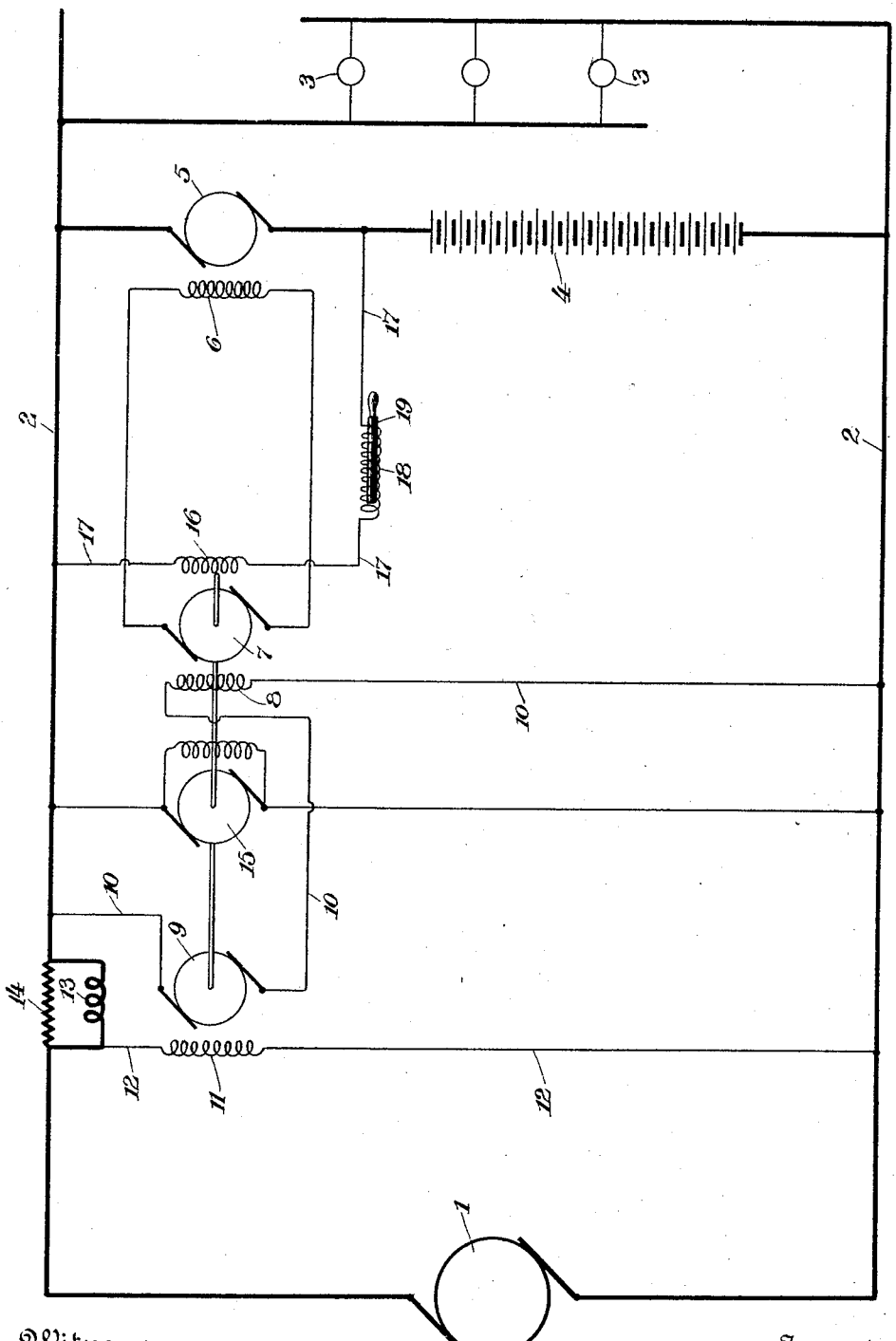

UNITED STATES PATENT OFFICE.

EDWARD VAN WAGENEN, OF NEW YORK, N. Y., ASSIGNOR TO GOULD STORAGE BATTERY COMPANY, A CORPORATION OF NEW YORK.

ELECTRICAL SYSTEM OF DISTRIBUTION.

1,003,829.　　　　Specification of Letters Patent.　　Patented Sept. 19, 1911.

Application filed July 12, 1909. Serial No. 507,102.

*To all whom it may concern:*

Be it known that I, EDWARD VAN WAGENEN, a citizen of the United States, and a resident of the city, county, and State of New York, have invented certain new and useful Improvements in Electrical Systems of Distribution, of which the following is a specification.

My invention relates to electrical systems of distribution and arrangements therefor, and although it may be adapted to be used in many situations, it is more especially designed for systems in which a regulating dynamo is arranged to control the division of load between a storage apparatus and a main source of electrical energy.

One object of my invention is to provide an arrangement in such systems such that the regulating action is exceptionally quick and may be efficiently controlled.

Further objects, features and advantages will more clearly appear from the detailed description given below, taken in connection with the accompanying drawing, which shows diagrammatically a system embodying one form of my invention.

Referring to the drawing, 1 represents a main generator feeding the consumption or supply circuit 2, 2 with translating devices connected to be fed thereby. Connected across the circuit 2, 2 is a storage apparatus or auxiliary battery 4 and in series therewith a booster 5. The booster 5 is provided with a field 6 connected to an exciter 7 to be supplied thereby. The booster 7 is provided with a field coil 8 in series with a counter machine 9 connected across the circuit 2, 2 by means of conductors 10. The counter machine 9 is provided with a field coil 11, which produces a substantially constant excitation and is connected across the mains 2, 2 by means of conductors 12. The counter machine 9 is also provided with a regulating field coil 13 connected across a shunt 14 in series in the circuit 2. The counter machine 9 and exciter 7 are driven by a shunt motor 15 connected across the circuit 2, 2. The booster 5 may be driven from the same motor or by a separate motor, as desired.

The exciter 7 is provided with an auxiliary field coil 16 opposing the coil 8, the coil 16 being connected across the terminals of the armature of the booster 5 by means of conductors 17. In series with the field 16 I provide a variable inductance 18, which may be regulated by a movable core 19.

The operation of the system is as follows. With a normal load on the system the main source 1 is designed to supply substantially all the load on the translating devices, the field excitation of the counter machine 9 being such that it produces an electromotive force which exactly balances the electromotive force supplied thereto by the mains 2, 2. Such being the case, the field 8 of the exciter 7 will be deënergized and no current will flow in the field 6 of the booster 5. Under these conditions, the booster 5 will produce no electromotive force, and the battery 4 will float across the line. If, however, the load on the translating devices increases, the strength of the field coil 13 will increase, thereby causing the counter machine 9 to produce a current in the circuit 10, 10 to energize the field 8 of the exciter 7, which in turn excites the booster 5 in a direction to cause the battery to discharge and take substantially the excess load. In a similar manner, if the load on the translating devices falls below normal, the counter machine 9 produces a current in the opposite direction, so that the exciter 7 excites the booster 5 in the opposite direction, thereby causing the battery to be charged from the mains 2, 2 in order to equalize the load on the system.

In order to quicken the action of the regulating apparatus above described, to more effectively control the division of load between the generator 1 and battery 4, the counter machine 9 and exciter 7 are so designed that with any variation of load upon the circuit 2, 2 the counter machine 9 will produce an electromotive force greater than would be ordinarily necessary, so that the exciter 7 is over-excited, which in turn over-excites the booster 5. By thus over-exciting the machines 7 and 5, the time in which the booster is brought up to complete excitation is much lessened and the effect on the battery charge or discharge is much more quickly felt. However, after the booster 5 has come into action, and has produced the proper charge or discharge current in the battery circuit, so that a material difference of potential exists across the booster terminals, the opposing field coil 16 becomes excited, thus cutting down the over-excitation of the regulating dynamo or exciter 7 so that the over-excitation of the booster 5 is also cut down to its proper value. The time in which this cutting down action takes place may be regulated by the variable inductance 18 in series with the coil 16 in the circuit 17, since the more inductance in the circuit the longer will it take for the coil 16 to produce its full counteracting effect.

I am aware that it has been suggested that the action of a regulating dynamo may be much quickened by initially over-exciting the same, but I do not claim this broadly. With my arrangement, the counteracting or cutting down of the field coil 16 is connected directly across the booster so that it does not act until the booster has actually produced the effect desired and is responsive only and wholly to the booster action and the effects produced thereby. The variable inductance 18 also affords means whereby the time of this cutting-down action may be effectively regulated in accordance with the conditions of the particular system in operation.

Although I have described my improvements in great detail, nevertheless I do not desire to be limited to such details except as hereinafter specified in the claims.

Having fully and clearly described my invention, what I claim as new and desire to secure by Letters Patent, is:—

1. In an electrical system of distribution, the combination of a main circuit, a battery connected across said circuit, a booster in series with the battery, an exciter supplying the booster field windings, field windings on the exciter subject to variations in the electrical condition of the system and field windings on the exciter connected across the booster armature and arranged to cut down the flux, tended to be produced by said first mentioned field windings both when the battery charges and when it discharges.

2. In an electrical system of distribution, the combination of a main circuit, a battery connected across said circuit, a booster in series with the battery, an exciter supplying the booster field windings, field windings on the exciter subject to variations in the load on said circuit and field windings on the exciter connected across the booster armature and arranged to cut down the flux, tended to be produced by said first mentioned field windings both when the battery charges and when it discharges.

3. In an electrical system of distribution, the combination of a main circuit, a battery connected across said circuit, a booster in series with the battery, an exciter supplying the booster field windings, field windings on the exciter subject to variations in the load on said circuit and field windings on the exciter connected to be responsive to variations in voltage across the booster and arranged to cut down the flux, tended to be produced by said first mentioned field windings both when the battery charges and when it discharges.

4. In an electrical system of distribution, the combination of a main circuit, a battery connected across said circuit, a booster in series with the battery, an exciter supplying the booster field windings, field windings on the exciter subject to variations in the electrical condition of the system and field windings on the exciter connected to be responsive to variations in the electrical condition of the booster and arranged to cut down the flux, tended to be produced by said first mentioned field windings both when the battery charges and when it discharges.

5. In an electrical system of distribution, a source of electrical energy, a circuit fed thereby, a storage apparatus in operative relation with the circuit, an electric machine for regulating the action of the storage apparatus, an exciter for said machine having a field coil responsive to certain electrical variations in said circuit and arranged to over-excite the exciter, and an opposing field coil on the exciter for cutting down said over-excitation, said opposing field coil being connected to be responsive to variations in the effects produced by the regulating machine.

6. In an electrical system of distribution, a source of electrical energy, a circuit fed thereby, a storage apparatus in operative relation with the circuit, an electric machine for regulating the action of the storage apparatus, an exciter for said machine having a field coil responsive to certain electrical variations in said circuit and arranged to over-excite the exciter, and an opposing field coil on the exciter for cutting down said over-excitation, said opposing field coil being connected across the regulating machine to be responsive to variations in the effects produced thereby.

7. In an electrical system of distribution, a source of electrical energy, a circuit fed thereby, a storage apparatus in operative relation with the circuit, a dynamo for regulating the action of the storage apparatus, an exciter for said dynamo having a field coil responsive to certain electrical variations in said circuit and arranged to over-excite the exciter, and an opposing field coil on the exciter for cutting down said over-excitation, said opposing field coil being connected to be responsive to variations in the output of the regulating dynamo.

8. In an electrical system of distribution, a storage apparatus, a regulating dynamo in operative relation thereto, means arranged to over-excite the regulating dynamo to cause it to build up quickly, and a coil arranged to cause said over-excitation to be cut down, said coil being connected to be responsive to variations in voltage across the regulating dynamo.

9. In an electrical system of distribution, a storage battery and a booster therefor, means arranged to over-excite the booster and a coil arranged to cause said over-excitation to be cut down, said coil being connected across the booster armature.

10. In an electrical system of distribution, the combination of a feed circuit, a booster operatively connected therewith, means responsive to variations in the electrical condition of the system for applying an excess excitation to the booster to cause it to build up quickly and a coil for causing said excess excitation to be cut down, said coil being responsive to voltage variations across the booster.

11. In an electrical system of distribution, the combination of a feed circuit, a booster therefor, an exciter for the booster, said exciter having a field coil for over-exciting the same responsive to variations in the electrical condition of the system, and a coil for causing said over-excitation to be cut down, said coil being connected across the booster armature.

12. In an electrical system of distribution, the combination of a feed circuit, a booster therefor, an exciter for the booster, said exciter having a field coil for over-exciting the same responsive to variations in the electrical condition of the system, and a coil for causing said over-excitation to be cut down, said coil being connected responsive to variations in the output of the booster.

13. In an electrical system of distribution, the combination of a main generator and its circuit, a regulating electric machine and apparatus therefor, an exciter for applying an excess excitation to said machine to cause it to build up quickly, and a coil for causing said excess excitation to be decreased as the output of the machine increases, said coil being connected to be responsive to variations in the voltage of the machine.

14. In an electrical system of distribution, a source of electrical energy, a circuit fed thereby, a regulating dynamo therefor, means for over-exciting the dynamo responsive to certain electrical variations of the system, means for cutting down the over-excitation of the dynamo and means for regulating the time in which said over-excitation is cut down.

15. In an electrical system of distribution, a source of electrical energy, a circuit supplied thereby, a booster therefor, means for over-exciting the booster responsive to certain electrical variations of the system, and a variable inductance for regulating the time in which said over-excitation is cut down.

16. In an electrical system of distribution, a source of electrical energy, a circuit supplied thereby, a storage apparatus in operative relation thereto, a regulating dynamo for said apparatus, means for over-exciting said dynamo responsive to variations in the electrical condition of the system, means for cutting down said over-excitation after its effect has been felt and means for regulating the time in which said over-excitation is cut down.

17. In an electrical system of distribution, a source of electrical energy, a circuit supplied thereby, a storage battery in operative relation therewith, a regulating dynamo therefor, means for over-exciting said dynamo responsive to variations in the electrical condition of the system, means for cutting down said over-excitation after its effect has been felt and a variable inductance for regulating the time in which said over-excitation is cut down.

18. In an electrical system of distribution, a source of electrical energy, a circuit supplied thereby, a storage battery in operative relation thereto, a booster for the battery, an exciter for the booster, means for over-exciting the exciter responsive to certain variations in the electrical condition of the system, means for cutting down said over-excitation, responsive to increases in the effects produced by the booster and means for regulating the time in which said over-excitation is cut down.

19. In an electrical system of distribution, a source of electrical energy, a circuit supplied thereby, a storage battery in operative relation therewith, a booster for the battery, an exciter for the booster, said exciter having a field coil for over-exciting the same responsive to variations in load on the system and a field coil for cutting down said over-excitation after its effect has been felt responsive to increases in the effects produced by the booster and a variable inductance operatively arranged with respect to said last mentioned field coil to regulate the time in which said over-excitation is cut down.

20. In an electrical system of distribution, a source of electrical energy, a circuit supplied thereby, a storage battery for the circuit, a booster for the battery, an exciter for the booster, a field coil on the exciter arranged to over-excite the same responsive to variations in load on the circuit, a field coil on the exciter arranged to cut down said over-excitation and connected across the booster, and a variable inductance in series with said last mentioned field coil to regulate the time in which said over-excitation is cut down.

In testimony whereof, I have signed my name to this specification, in the presence of two subscribing witnesses.

EDWARD VAN WAGENEN.

Witnesses:
GORHAM CROSBY,
EDWIN SEGER.

Copies of this patent may be obtained for five cents each, by addressing the "Commissioner of Patents, Washington, D. C."